(12) United States Patent
Echigo et al.

(10) Patent No.: US 8,357,341 B2
(45) Date of Patent: Jan. 22, 2013

(54) CARBON MONOXIDE REMOVAL METHOD, OPERATING METHOD FOR FUEL REFORMING SYSTEM, CARBON MONOXIDE REMOVER, FUEL REMOVAL SYSTEM HAVING THE CARBON MONOXIDE REMOVER, AND FILTER

(75) Inventors: Mitsuaki Echigo, Osaka (JP); Takeshi Tabata, Osaka (JP); Osamu Yamazaki, Osaka (JP)

(73) Assignee: Osaka Gas Co., Ltd., Osaka (JP)

( * ) Notice: Subject to any disclaimer, the term of this patent is extended or adjusted under 35 U.S.C. 154(b) by 0 days.

(21) Appl. No.: 13/118,774

(22) Filed: May 31, 2011

(65) Prior Publication Data

US 2011/0229383 A1 Sep. 22, 2011

Related U.S. Application Data

(62) Division of application No. 12/013,650, filed on Jan. 14, 2008, now Pat. No. 7,972,585, which is a division of application No. 10/472,983, filed as application No. PCT/JP02/02870 on Mar. 25, 2002.

(30) Foreign Application Priority Data

Mar. 28, 2001 (JP) ................................. 2001-091759
Mar. 28, 2001 (JP) ................................. 2001-91760
Mar. 28, 2001 (JP) ................................. 2001-91761

(51) Int. Cl.
*B01J 8/02* (2006.01)
*B01J 8/04* (2006.01)
*B01J 19/02* (2006.01)

(52) U.S. Cl. ........ 422/625; 422/627; 422/631; 422/211; 422/240; 422/241

(58) Field of Classification Search .................. 422/625, 422/627, 631, 211, 240, 241; 423/437.2, 423/650, 652; 429/412
See application file for complete search history.

(56) References Cited

U.S. PATENT DOCUMENTS 1,631,823 A * 6/1927 Jannek ........................... 423/210
3,607,130 A * 9/1971 Worley et al. .................. 422/625

(Continued)

FOREIGN PATENT DOCUMENTS

DE 3941766 A1 6/1991
EP 0955351 A1 11/1999

(Continued)

OTHER PUBLICATIONS

Guo Fengqin et al., "The Application of Home-Made Active Carbon in the Syn Gas Purification", The Second Chemical Fertilizer Factory of Qilu Petrochemical Co., Zibo, 255400, (1996).

(Continued)

*Primary Examiner* — Jennifer A Leung
(74) *Attorney, Agent, or Firm* — The Webb Law Firm

(57) ABSTRACT

In operating the carbon monoxide removal reactor or the fuel reforming system, there is provided a technique for removing carbon monoxide in a stable manner for an extended period of time. In a method of removing carbon monoxide including an introducing step of introducing a reactant gas including mixture gas and an oxidizer added thereto to a carbon monoxide removal reactor forming in its casing a catalyst layer comprising a carbon monoxide removal catalyst for removing carbon monoxide contained in the mixture gas and a removing step of removing the carbon monoxide by causing the oxidizer to react with the mixture gas on the carbon monoxide removal catalyst, in said introducing step, the reactant gas of 100° C. or lower is introduced to the carbon monoxide removal reactor.

5 Claims, 4 Drawing Sheets

U.S. PATENT DOCUMENTS

| | | | |
|---|---|---|---|
| 3,631,073 A | 12/1971 | Cohn et al. | |
| 4,134,733 A * | 1/1979 | Volker et al. | 422/177 |
| 4,448,757 A | 5/1984 | Barnwell et al. | |
| 4,740,361 A * | 4/1988 | Heyd et al. | 423/210 |
| 5,451,384 A | 9/1995 | Carr | |
| 5,456,889 A * | 10/1995 | Pow et al. | 422/173 |
| 5,702,838 A | 12/1997 | Yasumoto et al. | |
| 6,007,781 A * | 12/1999 | Campbell et al. | 422/122 |
| 6,164,373 A | 12/2000 | Perry et al. | |
| 6,165,428 A | 12/2000 | Eijkhoudt et al. | |
| 6,475,454 B1 * | 11/2002 | Cole et al. | 423/246 |
| 6,495,113 B2 | 12/2002 | Aoyama | |
| 6,780,386 B1 | 8/2004 | Fukunaga et al. | |
| 6,913,738 B1 | 7/2005 | Echigo et al. | |
| 6,986,797 B1 | 1/2006 | Clawson et al. | |
| 2004/0038093 A1 | 2/2004 | Echigo et al. | |

FOREIGN PATENT DOCUMENTS

| | | |
|---|---|---|
| EP | 1184336 A1 | 3/2002 |
| GB | 1555826 | 9/1977 |
| JP | 53053596 | 5/1978 |
| JP | 53068473 A | 6/1978 |
| JP | 62186010 | 8/1987 |
| JP | 6111838 A | 4/1994 |
| JP | 9266005 | 10/1997 |
| JP | 9271614 A | 10/1997 |
| JP | 9180749 | 11/1997 |
| JP | 9320624 A | 12/1997 |
| JP | 1029802 A | 2/1998 |
| JP | 11255512 | 9/1999 |
| JP | 11260387 A | 9/1999 |
| JP | 2000243425 | 9/2000 |
| JP | 2000351608 | 12/2000 |
| JP | 2001068137 A | 3/2001 |
| JP | 2001149781 A | 6/2001 |
| JP | 2002047002 A | 2/2002 |
| KR | 19870008100 | 9/1987 |
| KR | 96007736 | 6/1996 |
| WO | 0017097 A1 | 3/2000 |
| WO | 0053696 A1 | 9/2000 |
| WO | 0061491 A1 | 10/2000 |

OTHER PUBLICATIONS

Brynestad, J., "Iron and Nickel Carbonyl Formation in Steel Pipes and its Prevention—Literature Survey", Oak Ridge National Laboratory, Oak Ridge, Tennessee, operated by Union Carbide Corporation for the Energy Research and Development Administration, Sep. 1976, pp. 1-18.

* cited by examiner

CARBON MONOXIDE REMOVAL METHOD, OPERATING METHOD FOR FUEL REFORMING SYSTEM, CARBON MONOXIDE REMOVER, FUEL REMOVAL SYSTEM HAVING THE CARBON MONOXIDE REMOVER, AND FILTER

CROSS REFERENCE TO RELATED APPLICATION

This application is a divisional application of co-pending U.S. patent application Ser. No. 12/013,650 filed on Jan. 14, 2008, which is a divisional of U.S. patent application Ser. No. 10/472,983 filed Sep. 26, 2003, which is the national phase of PCT/JP02/02870, filed Mar. 25, 2002, which claims priority to JP2001-091759, filed Mar. 28, 2001; JP2001-091760 filed Mar. 28, 2001; and JP2001-091761 filed Mar. 28, 2001.

BACKGROUND OF THE INVENTION

1. Field of the Invention

The present invention relates to a method of removing carbon monoxide including an introducing step of introducing a reactant gas including mixture gas and an oxidizer added thereto to a carbon monoxide removal reactor forming in its casing a catalyst layer comprising a carbon monoxide removal catalyst for removing carbon monoxide contained in the mixture gas, such as a reformed gas obtained by reforming (steam reforming, partial combustion reforming, etc.) a hydrocarbon such as a natural gas, naphtha, kerosene or the like or an alcohol such as methanol, the mixture gas containing hydrogen ($H_2$) gas as the major component thereof and containing also carbon monoxide (CO) as a foreign substance, and a removing step of removing the carbon monoxide by causing the oxidizer to react with the mixture gas on the carbon monoxide removal catalyst. The invention relates also to a method of operating a fuel reforming system using the removing method.

Further, the invention relates also to the carbon monoxide removal reactor incorporating in its casing a catalyst portion comprising the carbon monoxide removal catalyst and adapted for allowing passage of the mixture through the catalyst portion and also to a technique usable for pre-treating the mixture gas to be introduced to such carbon monoxide removing device.

2. Description of Related Art

Conventionally, with a fuel reforming apparatus for producing reformed gas (gas containing 40 volume % or more (dry base) of hydrogen with using fossil fuel such as natural gas as raw material, the raw material was desulfurized and steam-reformed through a desulfurizer and a steam reformer disposed one after another, thereby to obtain the reformed gas containing hydrogen as the major component thereof and carbon monoxide, carbon dioxide ($CO_2$), water ($H_2O$), etc. Further, with a fuel reforming apparatus using an alcohol such as methanol as the raw material, the apparatus includes a methanol reformer incorporating a methanol reforming catalyst, thereby to obtain, from methanol, a reformed gas containing hydrogen as the major component thereof and carbon monoxide, carbon dioxide, water, etc.

Here, with a fuel reforming apparatus for making a reformed gas for use in a phosphoric acid fuel cell, it is known that the electrode catalyst of the fuel cell is poisoned by the presence of carbon monoxide. Therefore, the gas containing hydrogen as the major component thereof was introduced to a carbon monoxide shift converter for converting carbon monoxide into carbon dioxide through a carbon monoxide shift reaction, thereby to obtain a reformed gas with the carbon monoxide concentration in the gas being lower than a predetermined value (e.g. 0.5%).

However, in the case of a fuel reforming apparatus for producing a reformed gas for use in a polymer electrolyte fuel cell, since this polymer electrolyte fuel cell operates at a low temperature of about 80° C., its electrode catalyst will be poisoned, even if just a trace amount of carbon monoxide is present. Therefore, it is necessary to further reduce carbon monoxide to be contained in the reformed gas. So, on the downstream of the carbon monoxide shift converter, there was provided a carbon monoxide removal reactor incorporating a carbon monoxide removal catalyst for removing carbon monoxide. With this, the reformed gas treated by the carbon monoxide shift converter was introduced, with addition thereto of an oxidizer such as air, to the carbon monoxide removal reactor, so that carbon monoxide was oxidized into carbon dioxide in the presence of this carbon monoxide removal catalyst, whereby a reformed gas with reduced carbon monoxide concentration lower than a predetermined concentration (e.g. 100 ppm or lower) was obtained.

The carbon monoxide removal reactor includes, in its casing, an accommodating portion for accommodating a catalyst layer formed of a carbon monoxide removal catalyst such as ruthenium (Ru), rhodinm (Rh), platinum (Pt), palladium (Pd) or the like supported on a support made of, e.g. alumina. In operation, gas (reactant gas) containing the reformed gas and an oxidizer such as air added thereto is introduced through a gas inlet to the catalyst layer in the accommodating portion so as to come into contact with the carbon monoxide removal catalyst, whereby the carbon monoxide in the reformed gas is converted into carbon dioxide. Then, the reactant gas whose carbon monoxide content has been reduced by the passage through the catalyst layer is discharged from a gas outlet formed through the casing. Further, with the carbon monoxide removal catalyst, the reaction for oxidizing the carbon monoxide is selectively promoted when the temperature of the catalyst layer is about 80 to 200° C. Therefore, the convention provides a temperature adjusting means (heater, cooler or the like) to the casing so as to maintain the catalyst layer at such temperature range.

Incidentally, as the material forming the fuel reforming system, the convention has employed mainly stainless steel, which is an iron containing material, with consideration to various factors such as corrosion resistance, heat-resistance, strength, workability, cost, etc.

SUMMARY OF THE INVENTION

However, according to the recent finding made by the present inventors, if the carbon monoxide removal reactor is operated for a long period of time at the temperature favorable for the above-described function of the carbon monoxide removal catalyst, the carbon monoxide concentration in the reformed gas discharged from the carbon monoxide removal reactor will gradually increase to a level of a few tens of ppm, so that the carbon monoxide concentration becomes too high for use as fuel for the polymer electrolyte fuel cell. The reason for such performance deterioration of the carbon monoxide removal catalyst is a new finding not known in the prior art.

Therefore, in view of the above-described drawback, an object of the present invention is to provide a method capable of removing carbon monoxide in a stable manner for a long period of time in the operation of the carbon monoxide removal reactor or the fuel reforming system and also to provide a method of operating the fuel reforming system.

In view of the above-described drawback, a further object of the present invention is to provide a carbon monoxide removal reactor and a fuel reforming system which are capable of removing carbon monoxide present in a mixture gas containing hydrogen and carbon monoxide in a stable manner for a long period of time.

In view of the above-described drawback, a still further object of the present invention is to provide a carbon monoxide removal reactor and a filter capable of removing carbon monoxide present in a mixture gas containing hydrogen and carbon monoxide in a stable manner for a long period of time and also a carbon monoxide removing method using these.

For accomplishing the above-noted object, according to the first characterizing means of a method of removing carbon monoxide relating to the present invention, in a method of removing carbon monoxide including an introducing step of introducing a reactant gas including mixture gas and an oxidizer added thereto to a carbon monoxide removal reactor forming in its casing a catalyst layer comprising a carbon monoxide removal catalyst for, removing carbon monoxide contained in the mixture gas and a removing step of removing the carbon monoxide by causing the oxidizer to react with the mixture gas on the carbon monoxide removal catalyst, in said introducing step, the reactant gas of 100° C. or lower is introduced to the carbon monoxide removal reactor.

Further, in the first characterizing means described above, preferably, in said introducing step, the reactant gas of 80° C. or lower is introduced to the carbon monoxide removal reactor.

Or, in the first characterizing means described above, preferably, the reactant gas has a dew point of 60° C. or lower in its processing pressure.

Further preferably, the reactant gas has a dew point of 40° C. or lower in its processing pressure.

For accomplishing the above-noted object, according to the second characterizing means of a method of removing carbon monoxide relating to the present invention, in a method of removing carbon monoxide including an introducing step of introducing a reactant gas including mixture gas and an oxidizer added thereto to a carbon monoxide removal reactor forming in its casing a catalyst layer comprising a carbon monoxide removal catalyst for removing carbon monoxide contained in the mixture gas and a removing step of removing the carbon monoxide by causing the oxidizer to react with the mixture gas on the carbon monoxide removal catalyst, in said removing step, the catalyst layer is maintained at a maximum temperature between 130° C. and 180° C.

Further, in the second characterizing means described above, preferably, in said removing step, the maximum temperature of the catalyst layer is between 150° C. and 180° C.

For accomplishing the above-noted object, according to the third characterizing means of a method of removing carbon monoxide relating to the present invention, in a method of removing carbon monoxide including an introducing step of introducing a reactant gas including mixture gas and an oxidizer added thereto to a carbon monoxide removal reactor forming in its casing a catalyst layer comprising a carbon monoxide removal catalyst for removing carbon monoxide contained in the mixture gas and a removing step of removing the carbon monoxide by causing the oxidizer to react with the mixture gas on the carbon monoxide removal catalyst, in said introducing step, the reactant gas of 100° C. or lower is introduced to the carbon monoxide removal reactor and in said removing step, the catalyst layer is maintained at a maximum temperature between 130° C. and 180° C.

Further, in the above-described characterizing means, preferably, the mixture gas comprises a reformed gas obtained by reforming a hydrocarbon or an alcohol.

Or, in the above-described characterizing means, preferably, the carbon monoxide removal catalyst comprises a catalyst containing ruthenium.

For accomplishing the above-noted object, according to the first characterizing means of a method of operating a fuel reforming system relating to the present invention, in a method of operating a fuel reforming system including a reformer for reforming a raw fuel in a gas containing the raw fuel and steam into a mixture gas containing hydrogen and carbon monoxide, a carbon monoxide shift converter accommodating a carbon monoxide shift catalyst for converting the carbon monoxide contained in the mixture gas, and a carbon monoxide removal reactor accommodating a carbon monoxide removal catalyst for removing carbon monoxide contained in a reactant gas formed by adding an oxidizer to the mixture gas discharged from the carbon monoxide shift converter wherein said reformer, said shift converter and said removal reactor are pipe-connected in the mentioned order to be capable of communicating gas therebetween and there is provided a heat exchanger for communicating a heat transfer medium capable of effecting heat exchange with said mixture gas or said reactant gas communicating within a pipe interconnecting between said carbon monoxide shift converter and said carbon monoxide removal reactor, by said heat exchange between said heat transfer medium and said mixture gas or said reactant gas communicating within the pipe interconnecting between said carbon monoxide shift converter and said carbon monoxide removal reactor, the reactant gas communicating within a pipe downstream of a portion where said heat exchanger is disposed is maintained at 100° C. or lower and introduced to said carbon monoxide removal reactor.

For accomplishing the above-noted object, according to the first characterizing feature of a carbon monoxide removal reactor relating to the present invention, in a carbon monoxide removal reactor including a casing having a catalyst accommodating portion accommodating a carbon monoxide removal catalyst for removing carbon monoxide present in a mixture gas containing hydrogen and the carbon monoxide and a mixture gas communicating passage for introducing the mixture gas to the catalyst accommodating portion and discharging the mixture gas therefrom, inner wall faces of portions or entireties of said catalyst accommodating portion and said mixture gas communicating passage upstream thereof are formed of a non-iron material.

In the above-described characterizing feature, preferably, said non-iron material is a copper material.

Or, in the above-described characterizing feature, preferably, said non-iron material is ceramics or glass.

Or, in the above-described characterizing feature, preferably, the inner wall faces of portions or entireties of said catalyst accommodating portion and said mixture gas communicating passage upstream thereof are coated with at least one kind of coating material selected from the group consisting of alumina, silica and titania.

Or, in the above-described characterizing feature, said non-iron material is a synthetic resin.

Or, in the above-described characterizing feature, preferably, the inner wall faces of portions or entireties of said catalyst accommodating portion and said mixture gas communicating passage upstream thereof are coated with a synthetic resin.

Further, in the above-described characterizing feature, upstream of an area accommodating the carbon monoxide removal catalyst, there is provided iron collecting means for collecting at least one kind of substance selected from the group consisting of iron and iron compounds.

Further, for accomplishing the above-noted object, according to the first characterizing feature of a fuel reforming system relating to the present invention, in a fuel reforming system including a fuel reformer for reforming a hydrocarbon or an alcohol into a mixture gas containing hydrogen and carbon monoxide through a reforming reaction and the carbon monoxide removal reactor in the mentioned order, at a portion of the system extending from the fuel reformer to the carbon monoxide removal reactor; an inner wall face of a portion or entirety of a gas communicating passage contacting the mixture gas containing hydrogen and carbon monoxide flowing in the system is formed of non-iron material.

Further, for accomplishing the above-noted object, according to the second characterizing feature of a carbon monoxide removal reactor relating to the present invention, in a carbon monoxide removal reactor including a casing incorporating a catalyst portion comprising a carbon monoxide removal catalyst for removing carbon monoxide present in a mixture gas containing hydrogen and the carbon monoxide and adapted for allowing passage of the mixture gas through the catalyst portion, upstream of the catalyst portion, there is provided iron collecting means for collecting at least one kind of substance selected from the group consisting of iron and iron compounds.

In the above-described characterizing feature, preferably, the collecting portion is accommodated in said casing.

Further, in the above-described characterizing feature, preferably, said iron collecting means includes a porous material capable of collecting at least one kind of substance selected from the group consisting of iron and iron compounds.

Further, in the above-described characterizing feature, preferably, said porous material is a porous material containing alumina as the major component thereof.

Further, in the above-described characterizing feature, preferably, there is provided a temperature adjusting means capable of maintaining the temperature of said collecting portion at 80 to 200° C.

Further, for accomplishing the above-noted object, according to the first characterizing feature of a filter relating to the present invention, in a filter for pre-treating a mixture gas to be introduced to a carbon monoxide removal reactor including a carbon monoxide removal catalyst for removing carbon monoxide present in the mixture gas containing hydrogen and the carbon monoxide, there is provided a collecting portion having an iron collecting means capable of collecting at least one kind of substance selected from the group consisting of iron and iron compounds.

Further, for accomplishing the above-noted object, according to the fourth characterizing feature of a method of removing carbon monoxide relating to the present invention, in a method of removing carbon monoxide present in a mixture gas containing hydrogen and the carbon monoxide by causing the carbon monoxide to contact a carbon monoxide removal catalyst, the mixture gas is caused to contact the carbon monoxide removal catalyst after eliminating at least one kind of substance contained in the mixture gas selected from the group consisting of iron and iron compounds.

The functions/effects of these features are as follows.

The carbon monoxide removing method and the fuel reforming system using the method proposed by the present invention are based on the novel finding that the carbon monoxide removal catalyst accommodated in this carbon monoxide removal reactor is poisoned (iron poisoning) by iron or iron compound.

Further, the carbon monoxide removal reactor, the fuel reforming system and the filter proposed by the present invention are also based on the novel finding that the carbon monoxide removal catalyst is poisoned by iron or iron compound contained in the material forming the fuel reforming system.

The present inventors conducted extensive research to find out the cause for gradual reduction (degradation) in the carbon monoxide removing ratio of the carbon monoxide removal reactor. In this research, through analysis using the electron probe micro analysis (EPMA) on the surface condition of the degraded catalyst, it was confirmed that iron atoms in certain form are present on this surface. Further, the present inventors also confirmed that iron atoms are hardly present on the surface of non-degraded catalyst and therefore have come be believe that the degradation of catalyst is closely related to the presence of either iron or iron compound or both of iron and iron compound.

Then, the inventors further conducted research about where the iron or iron compound present on the degraded catalyst came from and found out that iron or iron compound contained in the components (e.g. the reactor, a pipe, a heat exchanger made of stainless steel) constituting the fuel reforming system can get mixed into the reformed gas and get stuck on the catalyst accommodated in the carbon monoxide removal reactor, thereby to block its active point.

Conventionally, it was not believed that the carbon monoxide removal catalyst can be subjected to iron poisoning in use of the carbon monoxide removal reactor under normal conditions. Having looked into the cause of iron or iron compound getting mixed in the reformed gas thereby to cause iron poisoning of the carbon monoxide removal catalyst, as one possibility, the following process is conceivable.

First, the reformed gas with reduced carbon monoxide concentration (e.g. of a typical composition of: 65% of hydrogen, 19% of carbon dioxide, 0.5% of carbon monoxide and 15.5% of steam) is discharged from the carbon monoxide shift converter at a temperature near an exit temperature (about 200° C.) of the carbon monoxide shift converter. However, the operating temperature of the carbon monoxide removal reactor subsequent thereto is lower than this (about 80 to 200° C.). Therefore, before the gas is introduced to the carbon monoxide removal reactor, there occurs heat discharge within the reactor or pipe interconnecting the carbon monoxide shift converter and the carbon monoxide removal reactor or the heat exchanger, so that its temperature is lowered. In the course of this, since the reformed gas has a high hydrogen concentration and also the stainless steel material or the like forming the pipe, the heat exchanger or the like contains iron and nickel, the iron and the carbon monoxide tends to become bonded with each other to form, e.g. iron carbonyl (Fe $CO_5$) to be freely released therein. Therefore, the iron will migrate together with the reformed gas and enter the carbon monoxide removal reactor and eventually get stuck with the carbon monoxide removal catalyst for poisoning it.

Further, it is also possible that other factors such as the oxidizer to be added for removing carbon monoxide between the carbon monoxide shift converter and the carbon monoxide removal reactor and the water or moisture condensed between the carbon monoxide shift converter and the carbon monoxide removal reactor may also be involved in the iron poisoning process.

In the above, even when the casing is made of stainless steel, the carbon monoxide concentration around the catalyst portion is reduced by the catalyst reaction. Therefore, it may be reasoned that the generation of the iron carbonyl is less than that from the upstream area of the carbon monoxide removal reactor.

Then, through the extensive and intensive research on the method of removing carbon monoxide from the mixture gas by using the carbon monoxide removal catalyst, the present inventors have found a carbon monoxide removing method which can restrict occurrence of iron poisoning of the carbon monoxide removal catalyst and achieved the present invention.

Further, the present inventors conceived of preventing poisoning of the carbon monoxide removal catalyst by restricting leak of iron and iron compound from the components constituting the fuel reforming system to the reformed gas to be supplied to the carbon monoxide removal reactor and conducted extensive and intensive research to complete the present invention.

Further, the present inventors conceived of preventing poisoning of the catalyst by removing, from the reformed gas to be supplied to the carbon monoxide removal reactor, at least one kind of substance selected from the group consisting of iron and iron compounds and thereafter causing this resultant gas to contact the catalyst and conducted extensive and intensive research to complete the present invention.

In the above, a method of removing carbon monoxide includes an introducing step of introducing a reactant gas including mixture gas and an oxidizer added thereto to a carbon monoxide removal reactor forming in its casing a catalyst layer comprising a carbon monoxide removal catalyst for removing carbon monoxide contained in the mixture gas and a removing step of removing the carbon monoxide by causing the oxidizer to react with the mixture gas on the carbon monoxide removal catalyst, in said introducing step, the reactant gas of 100° C. or lower is introduced to the carbon monoxide removal reactor. With this, it is believed that the bonding between the iron content forming the pipe or the like and the carbon monoxide hardly occurs, thereby to restrict generation of the iron carbonyl. Further, even if the iron carbonyl is generated, as its boiling point is 103° C., its evaporation can be restricted by keeping the temperature of the reactant gas at 100° C. or lower, so that the introduction thereof to the carbon monoxide removal reactor disposed downstream of the pipe can be restricted.

Incidentally, if the reactant gas is cooled to a temperature of 0° C. or higher, a simple convenient cooling means using such medium as air, water or the like can be used.

Further, in the first characterizing feature described above, the reactant gas of 80° C. or lower is introduced to the carbon monoxide removal reactor. With this, the generation rate of the iron carbonyl can be maintained sufficiently low and moreover the maximum temperature of the catalyst layer can be easily controlled.

In addition, if the reactant gas to be introduced to the carbon monoxide removal reactor contains a great amount of moisture, when the temperature of this reactant gas to be introduced to the inlet of the carbon monoxide removal reactor is reduced to a temperature lower than 100° C., condensation of the moisture will occur inside the pipe or the carbon monoxide removal reactor, thereby to cause random change in the cross-sectional area or the volume of the reactant gas passage inside the pipe or the carbon monoxide removal reactor, which may result in turn in a random variation in the flow amount of the reactant gas supplied to the carbon monoxide removal reactor or wetting of the carbon monoxide removal catalyst accommodated in the carbon monoxide removal reactor with the condensed water, thereby to cause deterioration in the activity. Then, in addition to lowering the temperature of the reactant gas to be introduced to the inlet of the carbon monoxide removal reactor, there is effected, prior to the introduction to the carbon monoxide removal reactor, condensation separation of steam contained in the reactant gas so that the reactant gas has a dew point of 60° C. or lower in its processing pressure. This restricts wetting of the carbon monoxide removal catalyst, thus deterioration in its activity. Also, it becomes possible to minimize the range of variation in the flow amount of the reactant gas inside the pipe or the carbon monoxide removal reactor. Further, even when S/C (mole ratio between steam and carbon contained in the raw fuel) varies in response to, e.g. change in the load, thereby to increase the amount of steam present in the reactant gas, by appropriately adjusting the amount of steam in the reactant gas to be introduced to the pipe or the carbon monoxide removal reactor, carbon monoxide can be eliminated in a stable manner.

Further, the reactant gas has a dew point of 40° C. or lower in its processing pressure. With this, it is possible to sufficiently restrict condensation of the steam in the reactant gas. Further, this extends the temperature range (in particular low temperature range) where the carbon monoxide in the reactant gas can be reduced to 10 ppm or less by the carbon monoxide removal catalyst. As a result, even when the reactant gas having a low temperature is introduced to the carbon monoxide removal reactor, the carbon monoxide removal reaction can be easily initiated.

On the other hand, it is known that the iron carbonyl is decomposed or polymerized at a high temperature. Then, a method of removing carbon monoxide includes an introducing step of introducing a reactant gas including mixture gas and an oxidizer added thereto to a carbon monoxide removal reactor forming in its casing a catalyst layer comprising a carbon monoxide removal catalyst for removing carbon monoxide contained in the mixture gas and a removing step of removing the carbon monoxide by causing the oxidizer to react with the mixture gas on the carbon monoxide removal catalyst, in said removing step, the catalyst layer is maintained at a maximum temperature of 130° C. or higher. With this, even if iron carbonyl enters the carbon monoxide removal reactor, this will be decomposed, so that its adhesion to the carbon monoxide removal catalyst can be controlled or with polymerization of the iron carbonyl, the adhered point can be decreased substantially.

Incidentally, if the temperature of the catalyst layer becomes too high, this will promote methanation reaction of the carbon dioxide, so that the hydrogen contained in the mixture gas will be wastefully consumed thus leading to a lower yield. Moreover, the reaction heat makes the temperature control difficult. For this reason, preferably, the maximum temperature of the catalyst layer should be maintained lower than 180° C.

In the above, the maximum temperature of the catalyst layer is maintained between 150° C. and 180° C. With this, it becomes also possible to extend the service life of the carbon monoxide removal catalyst (see Examples).

Further, a method of removing carbon monoxide includes an introducing step of introducing a reactant gas including mixture gas and an oxidizer added thereto to a carbon monoxide removal reactor forming in its casing a catalyst layer comprising a carbon monoxide removal catalyst for removing carbon monoxide contained in the mixture gas and a removing step of removing the carbon monoxide by causing the oxidizer to react with the mixture gas on the carbon monoxide removal catalyst, in said introducing step, the reactant gas of 100° C. or lower is introduced to the carbon monoxide removal reactor, thereby to restrict introduction of iron carbonyl to the catalyst layer, and in said removing step, the catalyst layer is maintained at a maximum temperature between 130° C. and 180° C., thereby to restrict adherence of the iron carbonyl to the carbon monoxide removal catalyst. With these combined effects, the poisoning of the carbon monoxide removal catalyst can be even more restricted, so that the carbon monoxide in the reactant gas can be removed at a very high ratio.

Further, the mixture gas is a reformed gas obtained by reforming a hydrocarbon or an alcohol in this case, if the carbon monoxide is removed by any of the methods discussed hereinabove, the carbon monoxide can be removed for a long period of time.

Further, the present invention also found out that in case the carbon monoxide removal catalyst is a catalyst containing ruthenium, the effect of iron poisoning such as reduction in the activity or reduction in the service life will be significant. Then, the method will be effective if employed for the construction, wherein the carbon monoxide removal catalyst is a catalyst containing ruthenium.

Now, a method of operating a fuel reforming system includes a reformer for reforming a raw fuel in a gas containing the raw fuel and steam into a mixture gas containing hydrogen and carbon monoxide, a carbon monoxide shift converter accommodating a carbon monoxide shift catalyst for converting the carbon monoxide contained in the mixture gas, and a carbon monoxide removal reactor accommodating a carbon monoxide shift catalyst for removing carbon monoxide contained in a reactant gas formed by adding an oxidizer to the mixture gas discharged from the carbon monoxide shift converter wherein said reformer, said shift converter and said removal reactor are pipe-connected in the mentioned order to be capable of communicating gas therebetween and there is provided a heat exchanger for communicating a heat transfer medium capable of effecting heat exchange with said mixture gas or said reactant gas communicating within a pipe interconnecting between said carbon monoxide shift converter and said carbon monoxide removal reactor, by said heat exchange between said heat transfer medium and said mixture gas or said reactant gas communicating within the pipe interconnecting between said carbon monoxide shift converter and the carbon monoxide removal reactor, the reactant gas communicating within a pipe downstream of a portion where said heat exchanger is disposed is maintained at 100° C. or lower and introduced to said carbon monoxide removal reactor. With this, the generation of iron carbonyl inside the pipe can be restricted. Accordingly, by introducing to the carbon monoxide removal reactor the reactant gas such temperature adjustment, introduction of the iron carbonyl to the catalyst layer can be restricted, thereby to alleviate the iron poisoning of the carbon monoxide removal catalyst, so that the carbon monoxide removing activity of the carbon monoxide removal catalyst can be maintained for an extended period of time.

Further, in a further embodiment of the present invention, a carbon monoxide removal reactor includes a casing having a catalyst accommodating portion accommodating a carbon monoxide removal catalyst for removing carbon monoxide present in a mixture gas containing hydrogen and the carbon monoxide and a mixture gas communicating passage for introducing the mixture gas to the catalyst accommodating portion and discharging the mixture gas therefrom, inner wall faces of portions or entireties of said catalyst accommodating portion and said mixture gas communicating passage upstream thereof are formed of a non-iron material. With this, elution of iron and iron compound to the mixture gas (fuel gas) can be eliminated, so that contact between the carbon monoxide removal catalyst and the iron and iron compound can be prevented. Then, the poisoning of the carbon monoxide removal catalyst with the iron and iron compound can be prevented, so that the activity of the carbon monoxide removal catalyst can be maintained high. As a result, the service life of the carbon monoxide removal catalyst can be extended and the trouble of maintenance and replacement of the carbon monoxide removal catalyst can be eliminated.

Incidentally, as for the portion of the carbon monoxide removal reactor coming into contact with the mixture gas, it is needed that at least a portion thereof, preferably, substantially its entirety, be formed of the non-iron material. As for the other portion, however, as such portion does not case supply of iron to the mixture gas, it may be formed of an iron-containing material. With this, the advantage (e.g. strength) of the iron-containing material such as stainless steel can be obtained and at the same time the iron poisoning of the carbon monoxide removal catalyst can be prevented.

In the above-described characterizing feature, the non-iron material is a copper material such as phosphate deoxidized copper, brass or the like. This is advantageous for its good corrosion resistance, thermal conductivity and weather resistance. Also, since deoxidized copper and brass have good weldability, even if the carbon monoxide removal reactor alone is formed of such copper material as phosphate deoxidized copper, brass or the like, the bonding between this and a member disposed upstream or downstream thereof is easy and firm, so that good durability can be obtained.

Further, the non-iron material is ceramics or glass material such as quartz or pyrex glass. This is preferred for the superior heat resistance and corrosion resistance of such material. For the same reason, enameling is also preferred. Further, as the iron poisoning of the carbon monoxide removal catalyst can be restricted, the life of the carbon monoxide removal catalyst can be extended, with this, the trouble of maintenance and replacement of the carbon monoxide removal catalyst can be eliminated.

In the above, in order to avoid contact between the mixture gas and the iron compound, the inner wall faces of portions or entireties of said catalyst accommodating portion and said mixture gas communicating passage upstream thereof are coated with at least one kind of coating material selected from the group consisting of alumina, silica and titania. With this, by e.g. coating the inner face of the conventional carbon monoxide removal reactor formed of such iron-containing material as stainless steel with the coating material, with simple working, the advantage of the iron-containing material can be obtained and at the same time, the iron poisoning of the carbon monoxide removal catalyst can be restricted in an economical manner.

Further, the non-iron material is a synthetic resin (e.g. Teflon resin, polyether ether ketone (PEEK) resin, or the like) which does not change in property or shape thereof in the operating temperature of the carbon monoxide removal reactor. This is advantageous for its low cost and superior workability.

Further, as the iron poisoning of the carbon monoxide removal catalyst can be restricted, the life of the carbon monoxide removal catalyst can be extended, with this, the trouble of maintenance and replacement of the carbon monoxide removal catalyst can be eliminated.

In the above, in order to avoid contact between the mixture gas and the iron compound, the inner wall faces of portions or entireties of said catalyst accommodating portion and said mixture gas communicating passage upstream thereof are coated with the synthetic resin. With this, by e.g. coating the inner face of the conventional carbon monoxide removal reactor formed of such iron-containing material as stainless steel with a film of the synthetic resin material, with simple working, the advantage of the iron-containing material can be obtained and at the same time, the iron poisoning of the carbon monoxide removal catalyst can be restricted in an economical manner.

Further, in case e.g. on a face contacting the gas upstream of the area accommodating the carbon monoxide removal catalyst, there is provided a member having its iron-containing material such as stainless steel exposed, in the first characterizing feature described above, upstream of an area accommodating the carbon monoxide removal catalyst, there is provided iron collecting means for collecting at least one kind of substance selected from the group consisting of iron and iron compounds. Then, this iron collecting means can collect the iron and iron compound scattered into the gas flowing from the upstream side of the area accommodating the carbon monoxide removal catalyst. With this, it becomes possible to further reduce the opportunity of contact between the carbon monoxide removal catalyst and the scattered iron or iron compound. Therefore, the life of the carbon monoxide removal catalyst can be extended, with this, the trouble of maintenance and replacement of the carbon monoxide removal catalyst can be eliminated.

Further, a fuel reforming system includes a fuel reformer for reforming a hydrocarbon or an alcohol into a mixture gas containing hydrogen and carbon monoxide through a reforming reaction and the carbon monoxide removal reactor at a portion of the system extending from the fuel reformer to the carbon monoxide removal reactor, an inner wall face of a portion or entirety of a gas communicating passage contacting the mixture gas containing hydrogen and carbon monoxide flowing in the system is formed of non-iron material. With this, even when such portion as above is placed in a temperature range tending to invite elution of iron, because of absence of iron source, there will occur no elution of iron and iron compounds to the carbon monoxide removal reactor, whereby the introduction of iron and iron compound to the downstream area can be restricted. With this construction, it is possible to further restrict adherence of iron and iron compounds to the carbon monoxide removal catalyst, thus further restricting the iron poisoning of the carbon monoxide removal catalyst. Consequently, the life of the carbon monoxide removal catalyst can be extended, and with this, the trouble of maintenance and replacement of the carbon monoxide removal catalyst can be eliminated.

In a still further embodiment of the present invention, a carbon monoxide removal reactor includes a casing incorporating a catalyst portion comprising a carbon monoxide removal catalyst for removing carbon monoxide present in a mixture gas containing hydrogen and the carbon monoxide and adapted for allowing passage of the mixture gas through the catalyst portion, upstream of the catalyst portion, there is provided iron collecting means for collecting at least one kind of substance selected from the group consisting of iron and iron compounds. With this, the mixture gas first passes the collecting portion, in the course of which the gas contacts the iron collecting means, whereby at least one kind of substance selected from the group consisting of iron and iron compounds is collected by the iron collecting means, so that the mixture gas from which at least one kind of substance selected from the group consisting of iron and iron compounds has been eliminated will reach the catalyst portion. Hence, the poisoning of the carbon monoxide removal catalyst provided at the catalyst portion will hardly occur, so that its activity can be maintained for a long period of time. Therefore, it is possible to provide a carbon monoxide removal reactor which can effect the reduction of the carbon monoxide concentration in a mixture gas containing hydrogen and carbon monoxide, for an extended period of time.

In the above, if it is considered that the mode of iron changes under the influence of the temperature and/or a co-existing substance, in order to restrict the occurrence of the iron poisoning more reliably, it is preferred that the iron collecting means collect iron and iron compounds. Or, depending on its use mode, if it is clear that a certain particular kind of iron-containing substance among iron and iron compounds promotes the iron poisoning especially, then, the iron collecting means may be employed which collects that particular kind of iron-containing substance.

Especially, the other devices, reactor or pipe or the heat exchanger constituting the fuel reforming system use much stainless steel. Therefore, considering the convenience of e.g. their interconnection, the carboy. monoxide removal reactor according to the present invention is useful in that the carbon monoxide removal reactor can be formed of stainless steel and at the same time the poisoning with iron or iron compound can be prevented.

In the above-described characterizing feature, the collecting portion is accommodated in the casing. With this, because of the short distance from the catalyst portion, even when there is employed a casing formed of a material which has the possibility of release of iron or iron compound, release of the iron or iron compound will hardly be invited between the collecting portion and the catalyst portion. Hence, this construction is preferred for preventing the poisoning of the catalyst.

Further, said iron collecting means includes a porous material capable of collecting at least one kind of substance selected from the group consisting of iron and iron compounds. With this, because of the high collecting efficiency for the at least one kind of substance selected from the group consisting of iron and iron compounds, the collecting portion can be formed compact.

Further, said porous material is a porous material containing alumina as the major component thereof. This has high adsorptivity for the at least one kind of substance selected from the group consisting of iron and iron compounds, then, the at least one kind of substance selected from the group consisting of iron and iron compounds can be easily collected.

Further, there is provided a temperature adjusting means capable of maintaining the temperature of said collecting portion at 80 to 200° C. With this, the use temperature of the collecting portion becomes in the same temperature range of the outlet temperature of the carbon monoxide shift converter disposed upstream thereof and also the temperature of the carbon monoxide removal catalyst disposed downstream thereof. As a result, the temperature control is facilitated advantageously.

Further, in a filter for pre-treating a mixture gas to be introduced to a conventional carbon monoxide removal reactor including a carbon monoxide removal catalyst for removing carbon monoxide present in the mixture gas containing hydrogen and the carbon monoxide, there is provided, on upstream of the removal reactor, a collecting portion having an iron collecting means capable of collecting at least one kind of substance selected from the group consisting of iron and iron compounds. With this, the at least one kind of substance selected from the group consisting of iron and iron compounds generated on the upstream side of the filter can be collected thereby to prevent contact between the catalyst and the at least one kind of substance selected from the group consisting of iron and iron compounds. With this, the poisoning of the catalyst can be prevented. Then, the poisoning of the carbon monoxide removal catalyst in the carbon monoxide removal reactor will hardly occur, so that its activity can be maintained for a long period of time. As a result, the reduction of the carbon monoxide concentration in the mixture gas containing hydrogen and the carbon monoxide becomes possible for a long period of time.

Further, by providing the filter independently of the carbon monoxide removal reactor, the conventional carbon monoxide removal reactor can be used as it is. Also, the maintenance of the iron collecting means can be carried out independently of the maintenance of the carbon monoxide removal reactor.

In the above, if it is considered that the mode of iron changes under the influence of the temperature and/or a co-existing substance, in order to restrict the occurrence of the iron poisoning more reliably, it is preferred that the iron collecting means collect iron and iron compounds. Or, depending on its use mode, if it is clear that a certain particular kind of iron-containing substance among iron and iron compounds promotes the iron poisoning especially, then, the iron collecting means may be employed which collects that particular kind of iron-containing substance.

Further, a method of removing carbon monoxide present in a mixture gas containing hydrogen and the carbon monoxide by causing the carbon monoxide to contact a carbon monoxide removal catalyst, the mixture gas is caused to contact the carbon monoxide removal catalyst after eliminating at least one kind of substance contained in the mixture gas selected from the group consisting of iron and iron compounds. With this, the causative substance for the poisoning of the carbon monoxide removal catalyst can be removed in advance before it comes into contact with the carbon monoxide removal catalyst. Therefore, as the mixture gas from which the at least one kind of substance has been removed is caused to contact the carbon monoxide removal catalyst, the iron poisoning can be restricted, so that its activity can be maintained high for a long time. Hence, the reduction of the carbon monoxide concentration in the mixture gas containing hydrogen and the carbon monoxide through the reaction with the carbon monoxide removal catalyst is possible for an extended period of time.

In the above, if it is considered that the mode of iron changes under the influence of the temperature and/or a co-existing substance, in order to restrict the occurrence of the iron poisoning more reliably, it is preferred that iron and iron compounds be eliminated from the mixture gas to contact the carbon monoxide removal catalyst.

DESCRIPTION OF THE PREFERRED INVENTION

Next, embodiments of the present invention will be described with reference to the accompanying drawings.

Figure 1:
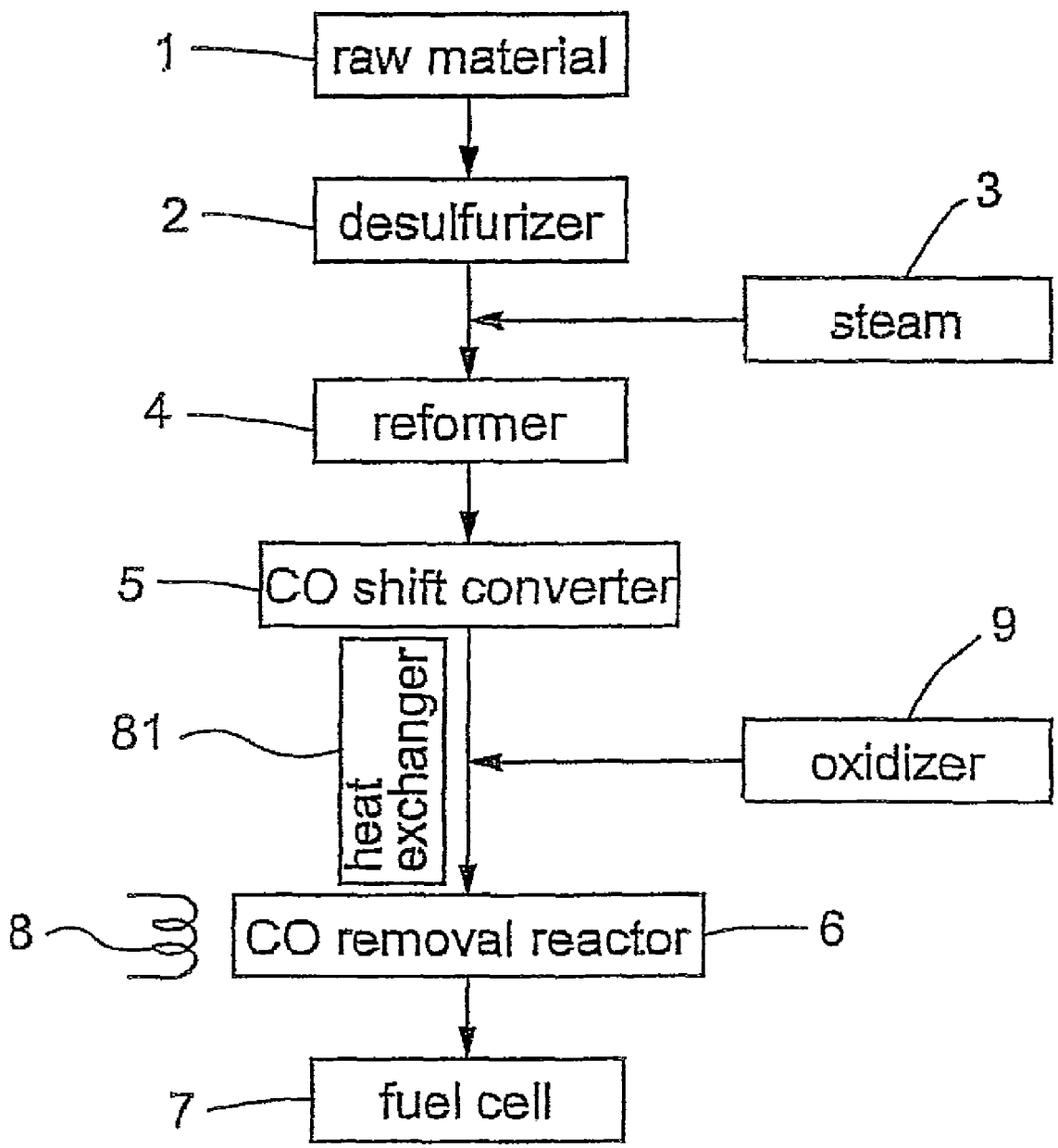
FIG. 1 is a conception diagram of a fuel cell system in which the present invention may be embodied.

FIG. 1 shows a fuel cell system capable of implementing a carbon monoxide removing method relating to the present invention. This fuel reforming system operates to produce from a raw fuel of natural gas (city gas) a reformed gas containing hydrogen as the major component thereof to be supplied to a polymer electrolyte fuel cell. Specifically, the system comprises a pipe-connected assembly of a raw fuel supplying line 1 supplying the raw fuel, a desulfurizer 2 accommodating a desulfurizing catalyst, a reformer 4 accommodating a steam reforming catalyst, a carbon monoxide shift converter 5 accommodating a carbon monoxide shift catalyst, and a carbon monoxide removal reactor 6 accommodating a carbon monoxide removal catalyst. The reformed gas (fuel gas) reformed by its passage through these components is supplied to a polymer electrolyte fuel cell 7.

The natural gas stored in the raw material supplying line 1 has its sulfur content thereof eliminated when being passed through the desulfurizer 2 by coming into contact with the desulfurizing catalyst. And, after being mixed with a water vapor supplied from a water vapor generator 3, the gas is then transported to the reformer 4, in which the gas is caused to contact the steam reforming catalyst so that the hydrocarbons present in the natural gas will be reformed mainly into hydrogen and also into carbon monoxide and carbon dioxide as byproducts. The reformed gas thus obtained is rich in hydrogen, but still contains about ten and a few % of carbon monoxide as the byproduct. Therefore, the gas with this composition cannot be supplied directly to the polymer electrolyte fuel cell 7. Then, at the carbon monoxide shift converter 5, the gas is caused to contact its carbon monoxide shift catalyst such as copper-zinc type catalyst, whereby the carbon monoxide present in the gas is converted into carbon dioxide and the concentration of carbon monoxide is reduced to about 0.5 to 1%.

Further, this reformed gas whose carbon monoxide concentration has been reduced to 0.5 to 1% is mixed with air (its oxygen acts as an oxidizer) supplied from an oxidizing agent supplier 9 and this mixture gas is introduced as a reactant gas via the pipe into the carbon monoxide removal reactor 6.

This carbon monoxide removal reactor 6 is constructed such that a catalyst layer comprising the carbon monoxide removal catalyst is accommodated in its casing for allowing passage of the reactant gas through the catalyst layer. As this carbon monoxide removal catalyst, there is employed, e.g. a catalyst including a support of e.g. an alumina ball supporting a precious metal such as ruthenium, platinum, rhodium, palladium, etc. thereon.

The reformed gas whose carbon monoxide concentration has been reduced to 0.5 to 1% is caused to enter, together with the oxidizer, the casing of the carbon monoxide removal reactor 6, in which the gas is caused to contact the catalyst layer accommodated inside this casing. The catalyst layer 12 includes a carbon monoxide removal catalyst, such that mainly through the catalytic reaction of this carbon monoxide removal catalyst, carbon monoxide reacts with oxygen to be oxidized into carbon dioxide. In this manner, the carbon monoxide present in the reformed gas is eliminated and consequently supplied to the polymer electrolyte fuel cell 7.

As the carbon monoxide removal reactor 6 operates such that the temperature of the catalyst layer range between about 80 and 180° C., there is provided a temperature adjusting means 8 for adjusting the temperature of the casing to that range. This temperature adjusting means 8 includes a heater and a heat source for heating the casing and a cooler for cooling the casing.

And, in order to restrict degradation of the activity due to adherence of iron-containing compounds such as iron carbonyl or metal iron entering the catalyst layer to the carbon monoxide removal catalyst surface and also to restrict the side reactions such as methanation of carbon dioxide, the temperature adjusting means 8 makes an adjustment such that the maximum temperature of the catalyst layer may range between 130° C. and 180° C., preferably between 150° C. and 180° C.

Further, along the outer wall face of some or all of the pipe interconnecting the carbon monoxide shift converter 5 and the carbon monoxide removal reactor 6, there is extended a heat exchanger 81, so that a heat transfer medium (such as air, water or the like) can flow within the heat exchanger via the wall surface of the pipe to be heat-exchangeable with the reformed gas or the reactant gas. The disposing position of this heat exchanger 81 may be before the position where the oxidizer is added to the reformed gas as shown in FIG. 1 or may also be at a position where the oxidizer has already been added to the reformed gas and this is flowing as the reactant gas or even at a position even more downstream. With occurrence of heat exchange between the heat transfer medium flowing within the heat exchanger 81 and the reformed gas or reactant gas flowing within the pipe, the mixture gas or reactant gas will be cooled. Hence, by appropriately adjusting e.g. the flow rate of the heat transfer medium after determining in advance e.g. the flow rate, temperature of the mixture gas or reactant gas to enter the, pipe, the temperature of the gas flowing from the portion where the heat exchanger 81 is disposed to the downstream side in the pipe is adjusted to be 100° C. or lower, preferably, lower than 80° C. with consideration to e.g. possible load variation. Incidentally, the temperature (lower limit) of the reactant gas will be determined, based on such factors as the installing environment of the carbon monoxide removal reactor 6, the temperature of the heat medium employed. pool As described hereinbefore, by implementing at least either of the above-described methods, i.e. the method of adjusting the temperature of the catalyst layer to be higher than 130° C. and lower than 180° C. or the other method of adjusting the temperature of the pipe contacting the upstream portion of the carbon monoxide removal reactor to a temperature of 100° C. or lower, iron poisoning of the carbon monoxide removal catalyst can be significantly restricted, thereby to improve the service life and the activity of the carbon monoxide removal catalyst. However, if these methods are implemented together, with the resultant multiplier effect thereof, the service life and the activity of the carbon monoxide removal catalyst may be even more improved.

Moreover, by providing a drain trap in the pipe to allow condensation of the steam present in the reactant gas introduced into the carbon monoxide removal reactor 6 and setting the dew point of the reactant gas at 60° C. or lower, preferably 40° C. or lower under the processing pressure, then, it becomes possible to avoid dew formation within the pipe or the carbon monoxide removal reactor.

The carbon monoxide removing method relating to the invention can use the carbon monoxide removal catalyst at a space velocity (GHSV) of preferably 500 to 50,000/h, more preferably, 100 to 30,000/h.

EXAMPLES

Next, there will be described experiments for demonstrating the effect of the carbon monoxide removing method of the present invention.

First, a γ-alumina support in the form of a sphere of 2-4 mm diameter was soaked in an aqueous solution of ruthenium trichloride to allow supporting of the ruthenium thereon by the impregnation method. After its drying, this was soaked in an aqueous solution of sodium carbonate and then washed with water and dried, whereby a precursor was obtained. This precursor was soaked in hydrazine solution to reduce the ruthenium present on the surface of the precursor and then water-washed again. After this was dried at 105° C., a ruthenium/alumina catalyst (A) was obtained. The ruthenium concentration in the resultant ruthenium/alumina catalyst (A) was 0.98 weight % and the average pore diameter was 7.4 DM.

Incidentally, in the following Examples 1 and 2, after the obtained ruthenium/alumina catalyst (A) was charged in the reaction tube, this was maintained at 220° C. for 1.5 hours in gas flow of nitrogen containing 5 volume % of hydrogen (pre-treatment). And, this pre-treatment is for enhancing the initial activity of the ruthenium/alumina catalyst at a low temperature.

Examples 1

8 cc of the above-described ruthenium/alumina catalyst (A) as the carbon monoxide removal catalyst was charged into a stainless steel reaction tube (casing) having an inner diameter of 21.2 mm and incorporating therein a thermocouple inserting sheath pipe having an outer diameter of 6 mm and then the above-described pre-treatment was effected, thereby to make two micro-reactors (carbon monoxide removal reactors). The simulated reactant gas introduced from the entrance of this carbon monoxide removal reactor will pass through the catalyst layer and then be discharged from its exit to the outside of the casing. Further, by heating the reaction tube from the outside with a heater, this carbon monoxide removal reactor allows control of the temperature of the reaction tube.

To the upstream side of the carbon monoxide removal reactor, there is connected a pipe made of stainless steel, through which pipe the simulated reactant gas is supplied to the carbon monoxide removal reactor.

As the simulated reactant gas, there was employed a gas having a composition of a gas obtained by mixing air to the exit gas of the carbon monoxide shift converter so as to obtain an oxygen/carbon monoxide mole ratio ($[O_2]/[CO]$) of 1.5 (simulated reactant gas obtained by adding steam to 1000 Nm liter/rain of mixture gas containing 0.5% of carbon monoxide, 0.5% of methane, 20.9% of carbon dioxide, 0.75% of oxygen, 3.0% of nitrogen and balance of hydrogen such that the steam concentration of the moist gas may be 5% (corresponding to a dew point of 33° C.). Incidentally, in this, the space velocity (GHSV) is 7,500/h (dry base).

Figure 2:
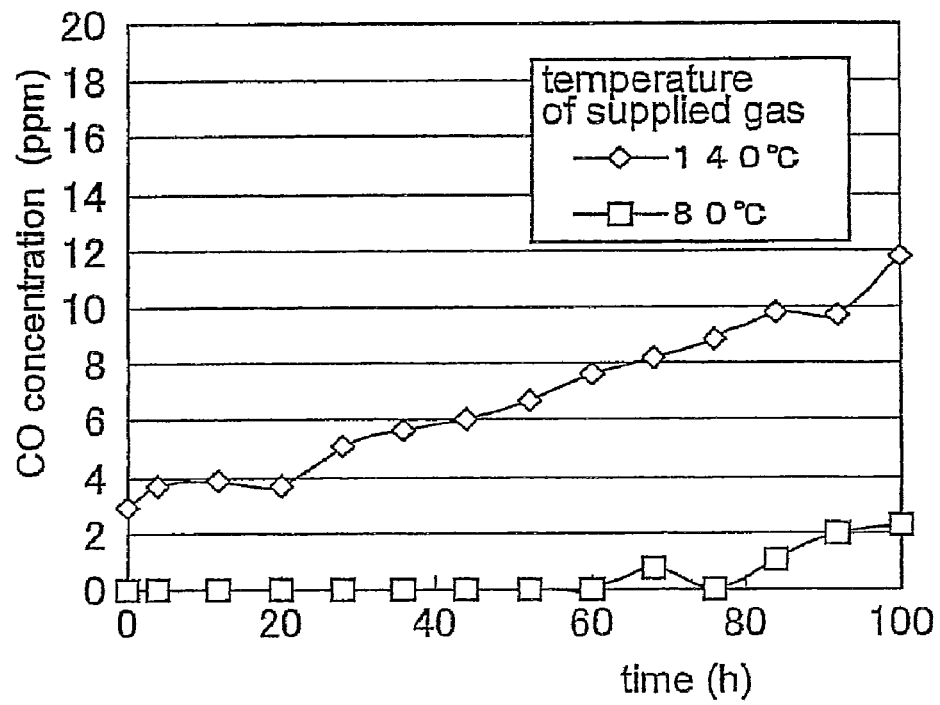
FIG. 2 is a graph showing correlation between the temperature of gas to be introduced to a carbon monoxide removal reactor and carbon monoxide removing activity.

The simulated reactant gas heated to 80° C. and the simulated reactant gas heated to 140° C. were supplied respectively to the pipes, and carbon monoxide removal was effected with adjusting the maximum temperature inside the casing of the carbon monoxide removal reactor connected to each pipe. Incidentally, the maximum temperature of the catalyst layer was 110° C. In this, from the exit (outlet) of the casing, the simulated reactant gas (exit gas) was sampled over time, and the carbon monoxide concentration (dry base) of this exit gas was determined by using a gas chromatograph apparatus including a thermal conductivity detector (TCD) and a hydrogen flame ionization detector (FID). FIG. 2 shows the result. Incidentally, the detectable lower limit for carbon monoxide of the gas chromatograph apparatus was 1 ppm.

In the case of the carbon monoxide removal reactor in which the 140° C. gas was supplied to the pipe, the carbon monoxide concentration of the exit gas began to rise immediately after the start of operation and exceeded 10 ppm 100 hours after the start of operation. On the other hand, in the case of the carbon monoxide removal reactor in which the 80° C. gas was supplied to the pipe, the carbon monoxide concentration was lower than the other carbon monoxide removal reactor from the start of the operation and the carbon monoxide concentration of the exit gas was still only about 2 ppm even after the lapse of 100 hours from the start of operation.

Then, the carbon monoxide removal catalyst with the reduced activity was taken out of the reaction tube and the atomic distribution on the surface of this carbon monoxide removal catalyst was analyzed by the EPMA and it was found that iron was present on the surface. On the other hand, in the case of the surface of the carbon monoxide removal catalyst which maintained the high activity, the atomic distribution analysis by the EPMA revealed that iron was below the detectable limit.

Therefore, it is believed that by maintaining the temperature of the reactant gas to be introduced to the carbon monoxide removal reactor at 100° C. or lower, introduction of iron content to the carbon monoxide removal reactor is restricted, whereby the activity of the carbon monoxide removal catalyst is maintained high.

Example 2

Except for charging 8 cc of spherical γ-alumina (alumina ball) of the diameter of 2 to 4 mm on the upstream of the catalyst layer, three carbon monoxide removal reactors of the same construction as the carbon monoxide removal reactor relating to Example 1 above were made. Then, gas having the same composition as the reactant gas used in Example 1 was heated to 140° C. and then supplied to the respective pipes. And, the temperatures of the casing of these three types of carbon monoxide removal reactors were maintained respectively at 100, 120 and 140° C., so that the maximum temperatures of the catalyst layers thereof may be 120, 140 and 160° C., respectively. The carbon monoxide concentrations (dry base) of the exit gases under these conditions are shown in FIG. 3.

Figure 3:
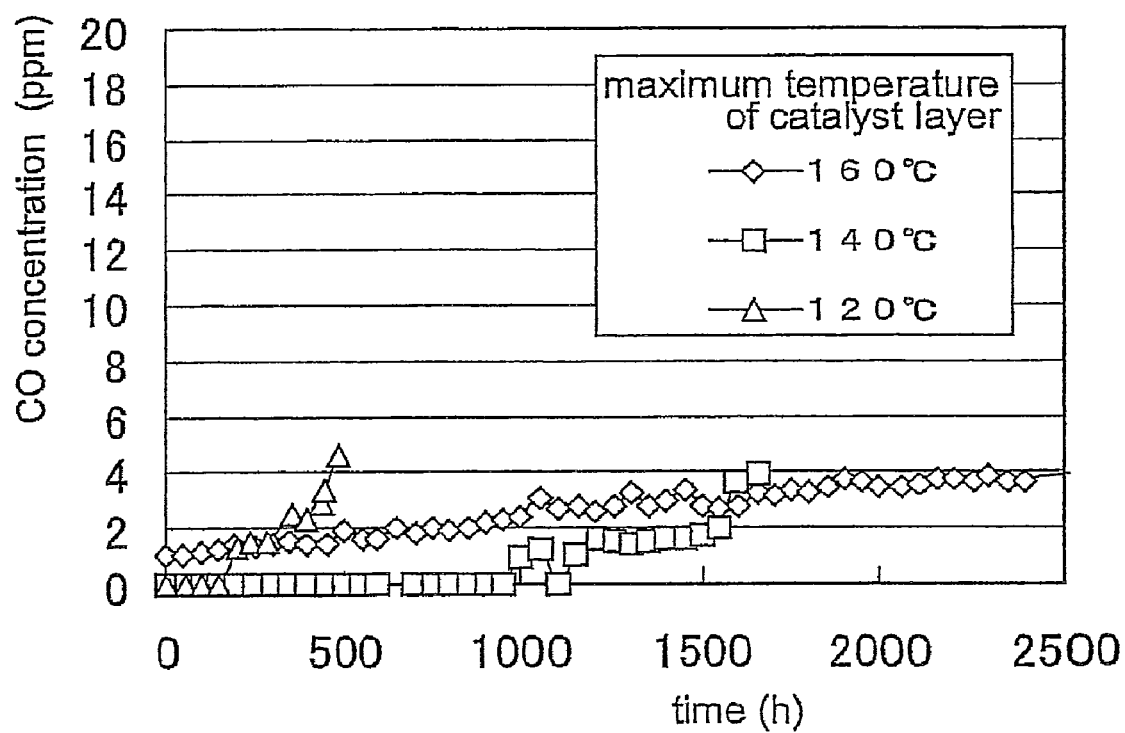
FIG. 3 is a graph showing correlation between the maximum temperature of a catalyst layer of the carbon monoxide removal reactor and the carbon monoxide removing activity.

As shown in FIG. 3, of the carbon monoxide removal reactors in which a simulated reactant gas simulating the exit gas of the carbon monoxide shift converter was heated to 140° C. which is a temperature tending to invite generation of iron carbonyl and then caused to pass the pipes thereof, it was found that the removal reactor in which the maximum temperature of the catalyst layer was in the vicinity of 120° C., its carbon monoxide removing ability began to decrease with lapse of a few hundreds of hours after the start of operation, thus being not suitable for operation for a long time.

On the other hand, in the case of the carbon monoxide removal reactor in which the temperature of the casing was 120 to 140° C., i.e. the maximum temperature of the catalyst layer was in the vicinity of 140 to 160° C., even after lapse of 1,000 hours or more, the removal reactor continued to maintain high carbon monoxide removing ability, with the carbon monoxide concentration of the exit gas being 4 ppm or lower. More particularly, in the case of the carbon monoxide removal reactor in which the maximum temperature of the catalyst layer was kept in the vicinity of 160° C., even after lapse of 2,500 hours or more, the removal reactor continued to maintain high carbon monoxide eliminating ability, with the carbon monoxide concentration of the exit gas being 4 ppm or lower. A similar result was obtained also with the carbon monoxide removal reactor in which the temperature in the casing was kept at 160° C., i.e. the maximum temperature of the catalyst layer was maintained in the vicinity of 180° C.

Then, each carbon monoxide removal catalyst was taken out of the reaction tube and the atomic distribution on the surface of this carbon monoxide removal catalyst was analyzed by the EPMA and it was found that iron was present on the surfaces of the three types of catalysts and on a portion of the alumina ball charged upstream thereof. Based on this, it was found that even at the entrance temperature range of 140° C. of the carbon monoxide removal reactor tending to invite introduction of the iron compound, the life of the carbon monoxide removal catalyst can be extended by varying the maximum temperature of the catalyst layer.

Therefore, it is believed that by maintaining the maximum temperature of the catalyst layer of the carbon monoxide removal reactor at 130 to 180° C., adhesion of iron to the surface of the carbon monoxide removal catalyst can be controlled, whereby the activity of the carbon monoxide removal catalyst is maintained high.

Next, a further embodiment of the present invention will be described with reference to the accompanying drawings.

Figure 4:
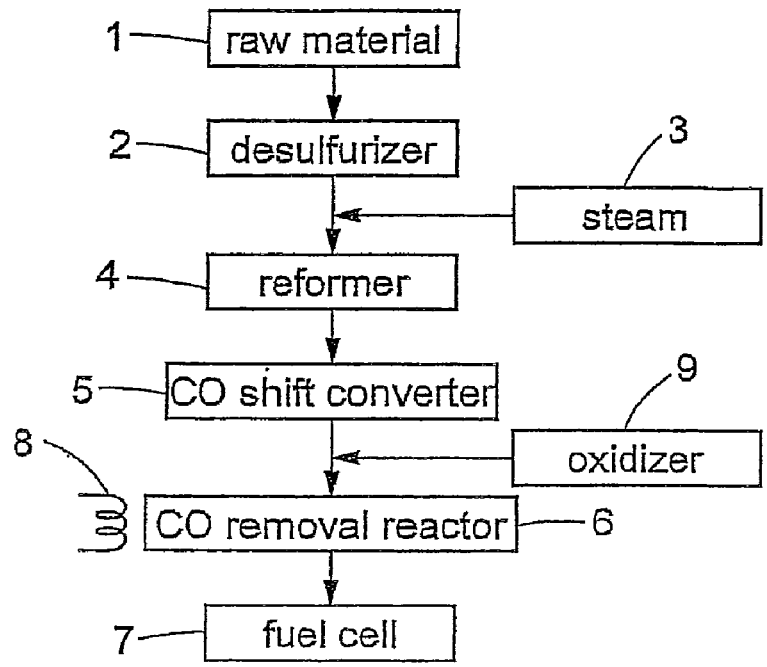
FIG. 4 is a conceptual diagram showing a further embodiment of the invention.

FIG. 4 shows a fuel reforming system having the carbon monoxide removal reactor relating to the present invention. This fuel reforming system operates to produce from a raw fuel of natural gas (city gas) a reformed gas containing hydrogen as the major component thereof to be supplied to a polymer electrolyte fuel cell. Specifically, the system comprises a pipe-connected assembly of a raw fuel supplying line 1 supplying the raw fuel, a desulfurizer 2 accommodating a desulfurizing catalyst, a reformer (fuel reformer) 4 accommodating a steam reforming catalyst, a carbon monoxide shift converter 5 accommodating a carbon monoxide shift catalyst, and the invention's carbon monoxide removal reactor 6 accommodating a carbon monoxide removal catalyst. The reformed gas reformed by its passage through these components is supplied to a polymer electrolyte fuel cell 7.

The natural gas supplied from the raw material supplying line I has its sulfur content thereof eliminated when being passed through the desulfurizer 2 by coming into contact with the desulfurizing catalyst. And, after being mixed with a water vapor supplied from a water vapor generator 3, the gas is then transported to the reformer 4, in which the gas is caused to contact the steam reforming catalyst so that the hydrocarbons present in the natural gas will be reformed mainly into hydrogen and also into carbon monoxide and carbon dioxide. The reformed gas thus obtained is rich in hydrogen, but still contains about ten and a few % of carbon monoxide as the byproduct. Therefore, if this gas is supplied directly, the electrode of the polymer electrolyte fuel cell 7 will be poisoned. Then, by operating the carbon monoxide shift converter 5 at about 200° C., the reformed gas is caused to contact its carbon monoxide shift catalyst such as copper-zinc type catalyst, whereby the carbon monoxide present in the gas is converted into carbon dioxide and the concentration of carbon monoxide is reduced to about 0.5 to 1%.

Further, this reformed gas whose carbon monoxide concentration has been reduced to 0.5 to 1% is mixed with air (its oxygen acts as an oxidizer) supplied from an oxidizing agent supplier 9 and this mixture gas is introduced as a reactant gas via the pipe into the carbon monoxide removal reactor 6 relating to the present invention.

This carbon monoxide removal reactor 6 is constructed such that portions or entireties of inner wall faces of the catalyst accommodating portion and the reformed gas passage are formed of non-iron material so as to prevent leak of iron or iron compounds inside the casing, thus preventing iron-poisoning of the carbon monoxide removal catalyst. To achieve this end, the entire casing can be formed of ceramics, glass such as quartz glass, or a synthetic resin (Teflon resin, PEEK resin) or the like whose property and shape hardly changes in the operating temperature of the carbon monoxide removal reactor 6. Or, the inner wall face of the casing formed mainly of e.g. stainless steel can be coated with the above-described non-iron material. Further, the entire casing need not be coated with the non-iron material. Even when the inner wall face contacting the mixture gas, the reactant gas has contact with the non-iron material, leak of iron and iron compound can be prevented.

Inside the casing, there is charged the carbon monoxide removal catalyst (e.g., a catalyst including a support of e.g. an alumina ball supporting a precious metal such as ruthenium, platinum, rhodium, palladium, etc. thereon), so that as the reactant gas comes into contact with the carbon monoxide removal catalyst, the carbon monoxide is oxidized into carbon dioxide. In this manner, the reformed gas whose carbon monoxide concentration has been reduced to 10 ppm or lower will be consequently supplied to the polymer electrolyte fuel cell 7.

As the carbon monoxide removal reactor operates such that the temperature of the catalyst layer range between about 80 and 200° C., there is provided a temperature adjusting means 8 for adjusting the temperature of the casing to that range. This temperature adjusting means 8 includes a heater and a heat source for heating the casing and a cooler for cooling the casing.

Also, if the carbon monoxide removal reactor is operated such that the catalyst layer is at 180° C., the progress of the side reaction is restricted, whereby consumption of hydrogen in the reactant gas can be restricted.

Further, the carbon monoxide removal reactor and the fuel reforming system having the removal reactor relating to the present invention are not limited to those for removing carbon monoxide through oxidization, but may be used for methanation removal of carbon monoxide for removing carbon monoxide through methanation process. In this case, no oxidizer will be introduced to the carbon monoxide removal reactor casing the catalyst and the removal reactor will be operated at a temperature of about 200° C. With this, carbon monoxide reacts with hydrogen to generate methane, whereby the carbon monoxide can be eliminated.

EXAMPLES

Next, there will be described experiments for demonstrating the effect of the carbon monoxide removal reactor relating to the present invention.

First, a γ-alumina support in the form of a sphere of 2-4 mm diameter was soaked in an aqueous solution of ruthenium trichloride to allow supporting of the ruthenium thereon by the impregnation method. After its drying, this was soaked in an aqueous solution of sodium carbonate and then washed with water and dried, whereby a precursor was obtained. This precursor was soaked in hydrazine solution to reduce the ruthenium present on the surface of the precursor and then water-washed again. After this was dried at 105° C., a ruthenium/alumina catalyst (B) was obtained. The ruthenium concentration in the resultant ruthenium/alumina catalyst was 0.5 weight % and the average maximum pore diameter was 7.1 nm.

Example 3

8 cc of the above-described ruthenium/alumina catalyst (B) as the carbon monoxide removal catalyst was charged into a reaction tube (casing) made of quartz, thereby to form a catalyst portion forming a catalyst layer, whereby a carbon monoxide removal reactor was made. The simulated reactant gas introduced from the entrance of this carbon monoxide removal reactor will pass through the catalyst layer and then be discharged from its exit to the outside of the casing. Further, this carbon monoxide removal reactor includes a temperature adjusting means having a heater, so that by heating the reaction tube with the heater from the outside, the temperature of the reaction tube can be controlled. Incidentally, upstream of the reaction tube, there is provided an evaporator tube made of quartz for supplying steam when the simulated reactant gas to be described later is to be prepared. And, this evaporator tube and the reaction tube are interconnected via a pipe made of Teflon resin.

While activating gas (hydrogen 6%, nitrogen 94%) was introduced to this carbon monoxide removal reactor at the rate of 1000 Nml/min, the temperature adjusting means was operated to raise the temperature of the reaction tube to 220° C. and then maintained at 220° C. for 1.5 hours, thereby to effect a pre-treatment. This pre-treatment is needed to effect on the simulated reactant gas in order to maintain high initial activity in case a main treatment to be described later is carried out at a low temperature.

Then, after the temperature of the reaction tube was lowered, the simulated reactant gas was introduced to the reaction tube with a space velocity (GHSV) of 7500/h (dry base) and the temperature of the reaction tube was controlled such that the maximum temperature of the catalyst layer may be 151° C., thereby to carry out the carbon monoxide eliminating reaction (main treatment). As the simulated reactant gas, there was employed a gas having a composition of a gas obtained by mixing air to the exit gas of the carbon monoxide shift converter so as to obtain a mole ratio of oxygen ($O_2$) relative to carbon monoxide (CO) of 1.6 (simulated reactant gas obtained by adding steam to mixture gas (1000 Nm liter/min)) containing 0.5% of carbon monoxide, 0.5% of methane, 20.9% of carbon dioxide, 0.8% of oxygen, 3.1% of nitrogen and balance of hydrogen such that the steam concentration of the moist gas may be 20%. Incidentally, the temperature of the evaporator tube and the pipe was set to 120° C. so that the temperature of the entrance gas of the reaction tube may be 120° C.

Comparison Example 2

Except that the reaction tube, the evaporator tube and the pipe connecting the reaction tube and the evaporator tube are made of SUS316 steel, selective oxidization reaction was carried out by the same process as Example 3 with using the carbon monoxide removal reactor having the same construction as Example 3.

(Result)

In the case of the carbon monoxide removal reactor relating to Example 3, the carbon monoxide concentration (dry base) in the exit gas was reduced to be 10 ppm or lower from the start of the operation and this concentration level was maintained during 96 hours of operation.

On the other hand, in the case of the carbon monoxide removal reactor relating to Comparison Example 2, the carbon monoxide concentration (dry base) in the exit gas was 10 ppm or lower at the start of the operation, but the carbon monoxide concentration level gradually increased thereafter to reach 14 ppm after lapse of 95 hours of operation.

Further, the carbon monoxide removal catalyst used in Example 3 was taken out after completion of the selective oxidation reaction (about 100 hours later) and the surface thereof was analyzed by the EPMA and it was found that the concentration of iron atoms present on the surface of the carbon monoxide removal catalyst was below the detectable limit. On the other hand, the result of the EPMA surface analysis of the Ru/alumina catalyst used in Comparison Example 2 revealed that at the time of the measurement iron atoms were detected and a portion of the surface of the carbon monoxide removal catalyst was covered with iron or iron compound.

From these results, it is apparent that there exists correlation between the activity reduction of the carbon monoxide removal catalyst and the adhesion of iron or iron compound to the surface of the carbon monoxide removal catalyst. Hence, by forming the inner wall faces of some or entire area of the casing contacting the carbon monoxide removal catalyst so as to prevent contact between the carbon monoxide removal catalyst and the iron and iron compound, it is possible to maintain the activity of the carbon monoxide removal catalyst high.

Figure 5:
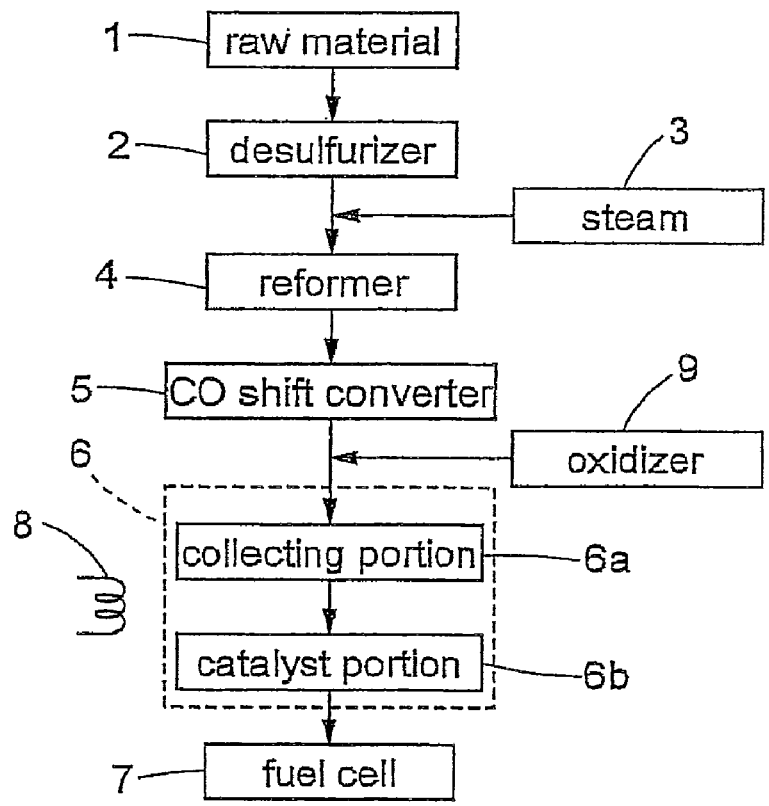
FIG. 5 is a conceptual diagram showing a still further embodiment of the invention.

Next, embodiments of the present invention will be described with reference to the accompanying drawings. FIG. 5 shows a fuel cell system capable of implementing a carbon monoxide removing method relating to the present invention. This fuel reforming system operates to produce from a raw fuel of natural gas (city gas) a reformed gas containing hydrogen as the major component thereof to be supplied to a polymer electrolyte fuel cell. Specifically, the system comprises a pipe-connected assembly of a raw fuel supplying line 1 supplying the raw fuel, a desulfurizer 2 accommodating a desulfurizing catalyst, a reformer 4 accommodating a steam reforming catalyst, a carbon monoxide shift converter 5 accommodating a carbon monoxide shift catalyst, and a carbon monoxide removal reactor 6 accommodating a carbon monoxide removal catalyst. The reformed gas reformed by its passage through these components is supplied to the polymer electrolyte fuel cell 7.

The natural gas introduced from the raw material supplying line 1 has its sulfur content thereof eliminated when being passed through the desulfurizer 2 by coming into contact with the desulfurizing catalyst. And, after being mixed with a water vapor supplied from a water vapor generator 3, the gas is then transported to the reformer 4, in which the gas is caused to contact the steam reforming catalyst so that the hydrocarbons present in the natural gas will be reformed into hydrogen, carbon monoxide and carbon dioxide. The reformed gas thus obtained is rich in hydrogen, but still contains about ten and a few % of carbon monoxide as the byproduct. Therefore, if this gas supplied directly, the electrode of the polymer electrolyte fuel cell 7 will be poisoned. Then, by operating the carbon monoxide shift converter 5 at about 200° C., the gas is caused to contact its carbon monoxide shift catalyst, whereby the carbon monoxide present in the gas is converted into carbon dioxide and the concentration of carbon monoxide is reduced to about 0.5 to 1%.

Further, this reformed gas whose carbon monoxide concentration has been reduced to 0.5 to 1% is mixed with air (its oxygen acts as an oxidizer) supplied from an oxidizing agent supplier 9 and this mixture gas is introduced as a reactant gas via the pipe into the carbon monoxide removal reactor 6 relating to the present invention.

This carbon monoxide removal reactor 6 includes, in its casing, a collecting portion 6a having iron collecting means (e.g. a porous member such as an alumina boll) for collecting at least one kind of substance selected from the group consisting of iron and iron compounds and a catalyst portion 6b disposed downstream thereof and including a support of e.g. an alumina ball supporting a precious metal such as ruthenium, platinum, rhodium, palladium, etc. thereon and is constructed such that the reactant gas past the collecting portion 6a may reach the catalyst portion 6b.

The reformed gas whose carbon monoxide concentration has been reduced to 0.5 to 1% is caused to enter first the collecting portion 6a wherein at least one kind of substance selected from the group consisting of iron and iron compounds is collected by the iron collecting means, so that the concentration of the at least one kind of substance selected from the group consisting of iron and iron compounds is reduced. Then, this reactant gas whose concentration of the at least one kind of substance selected from the group consisting of iron and iron compounds has been reduced is caused to enter the catalyst portion 6b wherein the gas is caused to contact the catalyst, whereby the carbon monoxide is oxidized into carbon dioxide. In this way, the carbon monoxide concentration of the reactant gas (reformed gas) is reduced eventually to 10 ppm or lower and then supplied to the polymer electrolyte fuel cell 7.

As the carbon monoxide removal reactor operates such that the temperature of the catalyst layer range between about 80 and 200° C., there is provided a temperature adjusting means 8 for adjusting the temperature of the casing to that range. This temperature adjusting means 8 includes a heater and a heat source for heating the casing and a cooler for cooling the casing. Further, in case the iron collecting means is formed of alumina or the like, its iron collecting ability is high at 80 to 200° C. Therefore, preferably, this should be temperature-adjusted by the temperature adjusting means 8, like the catalyst.

Further, if the carbon monoxide removal reactor is operated such that its catalyst layer may be 180° C., the progress of side reaction can be restricted, so that consumption of hydrogen in the reformed gas can be effectively restricted.

Further, in this further embodiment too, in order to prevent leak of iron and iron compounds, of the casing of the carbon monoxide removal reactor 6, at least the inner wall face of the catalyst portion may be formed of a non-iron material excluding the above-described iron and iron compounds. Further, if, at its portion extending from the reformer 4 to the carbon monoxide removal reactor 6, the inner wall face of a portion or entirety of the gas passage contacting the mixture gas flowing in the fuel reforming system and containing hydrogen and carbon monoxide is formed of the non-iron material, the leak of iron and iron compounds from the inner wall face may be restricted. With restriction of introduction of iron and iron compounds from the above-described area to the carbon monoxide removal reactor 6, the adhesion of iron and iron compounds to the carbon monoxide removal catalyst can be further reduced, whereby the iron poisoning of the carbon monoxide removal catalyst can be reduced significantly. In this, for maximum restriction of leak of iron and iron compounds, it is preferred that the entire inner wall face of the gas passage be formed of the non-iron material. However, in consideration of the difficulty, costs, etc of the operation, it is also possible to form only a portion of the gas passage of the non-iron material.

Such construction can be realized by e.g. non-iron material lining of the inner wall face of a portion or entirety of the gas passage contacting the mixture gas flowing in the system and containing hydrogen and carbon monoxide at the portion thereof extending from the reformer 4 to the carbon monoxide removal reactor 6. Alternatively, the entire member including such portion may be formed of the non-iron material. More specifically, the inner wall face of a portion or entirety of the pipe interconnecting the carbon monoxide removal reactor 6 and the carbon monoxide shift converter 5 upstream thereof may be lined with the non-iron material or this pipe may entirely be formed of the non-iron material.

Further, if the iron poisoning of the carbon monoxide removal catalyst is to be restricted in the conventional fuel reforming system including the carbon monoxide removal reactor, there may be provided, upstream of the entrance to the carbon monoxide removal reactor, a filter having a collecting portion including an iron collecting means capable of collecting at least one kind of substance selected from the group consisting of iron and iron compounds. With such construction, the at least one kind of substance selected from the group consisting of iron and iron compounds will be collected by the iron collecting means so as not to leak to the downstream thereof, so that introduction of the at least one kind of substance selected from the group consisting of iron and iron compounds to the carbon monoxide removal reactor of the conventional construction can be effectively restricted. Accordingly, with prevention of poisoning of the carbon monoxide removal catalyst, its activity can be maintained high.

The carbon monoxide removal reactor and the fuel reforming system having the removal reactor are not limited to those for removing carbon monoxide through oxidization, but may be used for methanation removal of carbon monoxide for removing carbon monoxide through methanation process. In this case, no oxidizer will be introduced to the carbon monoxide removal reactor casing the above-described catalyst and the removal reactor will be operated at a temperature of about 200° C. With this, carbon monoxide reacts with hydrogen to generate methane, whereby the carbon monoxide can be reduced.

EXAMPLES

Next, there will be described experiments for demonstrating the effect of the carbon monoxide removing method of the present invention.

Example 4

Figure 6:
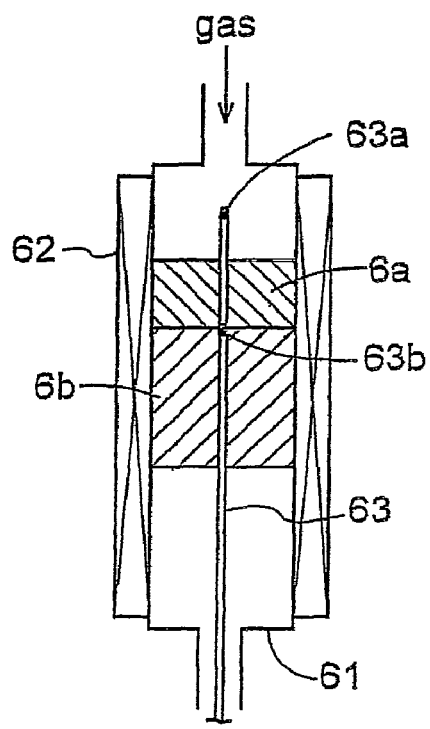
FIG. 6 is a section view of a reaction tube for implementing the present invention.

As shown in FIG. 6, 8 cc of the Ru/alumina (B) as the carbon monoxide removal catalyst was charged to the downstream (exit) side of a reaction tube 61 made of SUS and including, along its outer periphery, a temperature adjusting means 62 having a heater and a cooler, thereby to form a catalyst portion 6b. Further, to the upstream (entrance) side of the catalyst portion 6b of the reaction tube 61, 8 cc of alumina balls was charged at the iron collecting means, thereby to form the collecting portion 6a. With these, the iron monoxide removal reactor 6 was prepared. Incidentally, the alumina balls are capable of collecting iron and many iron compounds through adsorption.

The simulated reactant gas introduced into the reaction tube 61 through the entrance of the carbon monoxide removal reactor 6 is caused to pass the collecting portion 6a and the catalyst portion 6b and then is discharged through the exit to the outside of the reaction tube 61. The temperature inside this carbon monoxide removal reactor 6 is monitored by a thermocouple 63 having a determining point 63a for determining the temperature at the entrance of the carbon monoxide removal reactor 6 and a determining point 63b for determining the temperatures of the collecting portion 6a and the catalyst portion 6b. These positions are variable. Based on these monitoring results, the temperature adjusting means 62 heats/cools the reaction tube 61, thereby to render the temperature of the reaction tube 61 controllable. Incidentally, upstream of the reaction tube 61, there is provided an evaporator tube (not shown) made of SUS for supplying steam in the course of preparation of the simulated reactant gas to be detailed later. And, this evaporator tube and the reaction tube are connected to each other via a pipe made of SUS. To this carbon monoxide removal reactor, activating gas (6% of hydrogen, 94% of nitrogen) was introduced at a rate of 1000 Nml/min, while the temperature of the reaction tube was raised to 220° C. by the temperature adjusting means and the temperature was maintained at 220° C. for 1.5 hours, thereby to effect a pre-treatment. This pre-treatment is needed to maintain high initial activity of the carbon monoxide removal catalyst in case a main treatment to be described later is carried out at a low temperature (120° C.).

Then, after the temperature of the reaction tube was lowered to 120° C., while the temperature was maintained at this 120° C., the simulated reactant gas was introduced to the reaction tube with the temperature of the entrance gas being 120° C. and a space velocity (GHSV) of 7500/h (dry base), thereby to carry out the carbon monoxide removing reaction (main treatment). As the simulated reactant gas, there was employed a gas having a composition of a gas obtained by mixing air to the exit gas of the carbon monoxide shift converter so as to obtain a mole ratio of oxygen ($O_2$) relative to carbon monoxide (CO) of 1.6 (simulated reactant gas obtained by adding steam to mixture gas (1000 Nm liter/min)) containing 0.5% of carbon monoxide, 0.5% of methane, 20.9% of carbon dioxide, 0.8% of oxygen, 3.1% of nitrogen and balance of hydrogen such that the steam concentration of the moist gas may be 20%.

Incidentally, the maximum temperature of the catalyst layer was 147° C.

Comparison Example 3

Except that the alumina ball as the iron collecting means was not charged to the reaction tube, oxidization reaction was carried out by the same process as Example 4 with using the carbon monoxide removal reactor having the same construction as Example 4.

Figure 7:
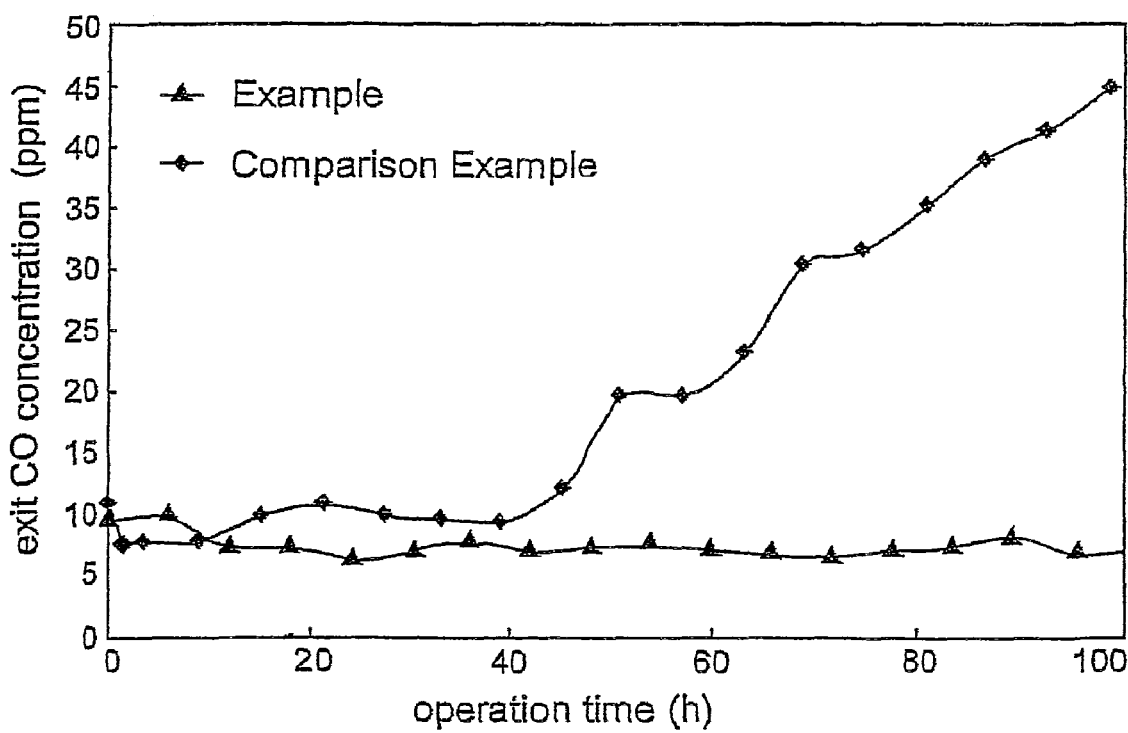
FIG. 7 is a graph showing effect of the present invention.

FIG. 7 shows changes in the carbon monoxide concentrations (dry base) of the reformed gases (exit gases) obtained by the carbon monoxide removing reactions of Example 4 and Comparison Example 3.

In the case of the carbon monoxide removal reactor relating to Example 4, the carbon monoxide concentration (dry base) in the exit gas was restricted to be 10 ppm or lower from the start of the operation and this concentration level was maintained during 100 hours of operation. On the other hand, in the case of the carbon monoxide removal reactor relating to Comparison Example, the carbon monoxide concentration in the exit gas was 10 ppm or lower from the start of the operation until 40 hours later, but the carbon monoxide concentration level gradually increased thereafter to reach 40 ppm after lapse of 100 hours of operation.

Further, the carbon monoxide removal catalyst used in Example 4 was taken out after completion of the preferential oxidation reaction of the carbon monoxide (about 100 hours later) and the surface thereof was analyzed by the EPMA and it was found that the concentration of iron atoms present on the surface of the carbon monoxide removal catalyst was below the detectable limit. On the other hand, the result of the EPMA surface analysis of the Ru/alumina catalyst used in Comparison Example 3 revealed that at the time of the measurement iron atoms were detected.

Also, when the alumina ball employed as the iron collecting means in Example 4 was taken out, there was observed brownish color change at a portion in the surface of the alumina ball. The EPMA analysis of this portion revealed presence of iron atoms.

From these results, it is apparent that there exists correlation between the activity reduction of the carbon monoxide removal catalyst and the adhesion of iron or iron compound to the surface of the carbon monoxide removal catalyst. Hence, with the carbon monoxide removal reactor according to the present invention, by providing the iron collecting means so as to prevent introduction of at least one kind of substance selected from the group consisting of iron and iron compounds, it is possible to maintain the activity of the carbon monoxide removal catalyst high.

Incidentally, in all of the embodiments described above, in embodying the invention, the kinds of the desulfurizing catalyst, the reforming catalyst, the carbon monoxide shift catalyst, and the carbon monoxide removal catalyst to be employed in the fuel reforming system are not particularly limited, and these may be conventional ones. Further, the reforming process is not limited to the steam reforming, but may be partial combustion reforming. And, the invention may be employed for removing carbon monoxide resulting therefrom. Further, the carbon monoxide removal reactor relating to the present invention may be employed also for elimination of carbon monoxide contained in a fuel gas obtained by reforming methanol, naphtha, etc.

What is claimed is:

1. A fuel reforming system comprising, in the following order:
   a fuel reformer for reforming a hydrocarbon or an alcohol into a mixture gas containing hydrogen and carbon monoxide through a reforming reaction, and
   a carbon monoxide removal reactor comprising a casing having,
      a catalyst accommodating portion accommodating a carbon monoxide removal catalyst for removing carbon monoxide present in the mixture gas containing hydrogen and carbon monoxide, and
      a mixture gas communicating passage for introducing the mixture gas to the catalyst accommodating portion and discharging the mixture gas therefrom,
   wherein,
   portions or entireties of inner wall faces of said catalyst accommodating portion and said mixture gas communicating passage upstream thereof of the carbon monoxide removal reactor are formed of a non-iron material,
   at a pipe extending from the fuel reformer to the carbon monoxide removal reactor, a portion or entirety of an inner wall face of the pipe contacting the mixture gas containing hydrogen and carbon monoxide flowing in the system is formed of a non-iron material, and
   portions or entireties of the inner wall faces of said catalyst accommodating portion and said mixture as communicating passage upstream thereof are coated with at least one kind of coating material selected from the group consisting of alumina, silica, and titania.

2. A carbon monoxide removal reactor comprising:
   a casing having:
      a catalyst accommodating portion accommodating a carbon monoxide removal catalyst for removing carbon monoxide present in a mixture gas containing hydrogen and carbon monoxide; and
      a mixture gas communicating passage for introducing the mixture gas to the catalyst accommodating portion and discharging the mixture gas therefrom,
   wherein portions or entireties of inner wall faces of said catalyst accommodating portion and said mixture gas communicating passage upstream thereof are formed of a non-iron material,
   said catalyst accommodating portion and said mixture gas communicating passage upstream thereof are adapted for allowing passage of the mixture gas supplied from a pipe, the pipe having a portion or entirety of an inner wall face formed of a non-iron material and being connected to an upstream side of the casing, and
   portions or entireties of the inner wall faces of said catalyst accommodating portion and said mixture gas communicating passage upstream thereof are coated with at least one kind of coating material selected from the group consisting of alumina, silica, and titania.

3. A carbon monoxide removal reactor comprising:
   a casing having:
      a catalyst accommodating portion accommodating a carbon monoxide removal catalyst for removing carbon monoxide present in a mixture gas containing hydrogen and carbon monoxide; and
      a mixture gas communicating passage for introducing the mixture gas to the catalyst accommodating portion and discharging the mixture gas therefrom,
   wherein portions or entireties of inner wall faces of said catalyst accommodating portion and said mixture gas communicating passage upstream thereof are formed of a non-iron material,
   said catalyst accommodating portion and said mixture gas communicating passage upstream thereof are adapted for allowing passage of the mixture gas supplied from a pipe, the pipe having a portion or entirety of an inner wall face formed of a non-iron material and being connected to an upstream side of the casing,
   said non-iron material is a synthetic resin, and
   portions or entireties of the inner wall faces of said catalyst accommodating portion and said mixture gas communicating passage upstream thereof are coated with the synthetic resin.

4. The carbon monoxide removal reactor according to claim 3, wherein said synthetic resin is polytetrafluoroethylene resin or polyether ether ketone.

5. A fuel reforming system comprising, in the following order:
   a fuel reformer for reforming a hydrocarbon or an alcohol into a mixture gas containing hydrogen and carbon monoxide through a reforming reaction, and
   a carbon monoxide removal reactor comprising a casing having,
      a catalyst accommodating portion accommodating a carbon monoxide removal catalyst for removing carbon monoxide present in the mixture gas containing hydrogen and carbon monoxide, and
      a mixture gas communicating passage for introducing the mixture gas to the catalyst accommodating portion and discharging the mixture gas therefrom,
   wherein,
   portions or entireties of inner wall faces of said catalyst accommodating portion and said mixture gas communicating passage upstream thereof of the carbon monoxide removal reactor are formed of a non-iron material, at a pipe extending from the fuel reformer to the carbon monoxide removal reactor, a portion or entirety of an inner wall face of the pipe contacting the mixture gas containing hydrogen and carbon monoxide flowing in the system is formed of a non-iron material, said non-iron material is a synthetic resin, and portions or entireties of the inner wall faces of said catalyst accommodating portion and said mixture gas communicating passage upstream thereof are coated with the synthetic resin.

* * * * *